(12) United States Patent
Holtsclaw et al.

(10) Patent No.: US 11,390,798 B2
(45) Date of Patent: Jul. 19, 2022

(54) ACIDIZING AND INTERFACIAL TENSION REDUCING HYDROLYSABLE OILS FOR SUBTERRANEAN TREATMENTS

(71) Applicant: Halliburton Energy Services, Inc., Houston, TX (US)

(72) Inventors: Jeremy Holtsclaw, Kingwood, TX (US); Enrique Antonio Reyes, Tomball, TX (US); Antonio Recio, Humble, TX (US)

(73) Assignee: Hallburton Energy Services, Inc., Houston, TX (US)

( * ) Notice: Subject to any disclaimer, the term of this patent is extended or adjusted under 35 U.S.C. 154(b) by 214 days.

(21) Appl. No.: 16/613,041

(22) PCT Filed: Jul. 28, 2017

(86) PCT No.: PCT/US2017/044361
§ 371 (c)(1),
(2) Date: Nov. 12, 2019

(87) PCT Pub. No.: WO2019/022763
PCT Pub. Date: Jan. 31, 2019

(65) Prior Publication Data
US 2020/0165512 A1    May 28, 2020

(51) Int. Cl.
*C09K 8/74*    (2006.01)
*C09K 8/594*    (2006.01)
*C09K 8/70*    (2006.01)
*E21B 43/26*    (2006.01)

(52) U.S. Cl.
CPC ............... *C09K 8/74* (2013.01); *C09K 8/594* (2013.01); *C09K 8/703* (2013.01); *E21B 43/26* (2013.01)

(58) Field of Classification Search
CPC ...................................................... C09K 8/72
See application file for complete search history.

(56) References Cited

U.S. PATENT DOCUMENTS

| | | |
|---|---|---|
| 3,822,747 A | 7/1974 | Maguire |
| 4,650,000 A | 3/1987 | Andreasson |
| 4,737,296 A * | 4/1988 | Watkins ................... C09K 8/52 166/307 |

(Continued)

OTHER PUBLICATIONS

International Search Report ana Written Opinion dated Apr. 23, 2018; International PCT Application No. PCT/U62017/044361.

(Continued)

*Primary Examiner* — William D Hutton, Jr.
*Assistant Examiner* — Avi T Skaist
(74) *Attorney, Agent, or Firm* — McGuireWoods LLP

(57) ABSTRACT

Provided are methods and systems for treating a subterranean formation. One such method includes preparing an emulsion comprising: an aqueous liquid; a multifunction hydrolysable oil; a co-solvent; and a surfactant. The method further includes combining the emulsion with a carrier fluid to provide a treatment fluid. The method additionally includes introducing the treatment fluid to the subterranean formation. The method also includes contacting hydrocarbons within the subterranean formation with the treatment fluid, and hydrolyzing the multifunction hydrolysable oil to provide an organic acid and an alcohol within the subterranean formation.

20 Claims, 5 Drawing Sheets

(56) References Cited

U.S. PATENT DOCUMENTS

| | | | |
|---|---|---|---|
| 4,807,703 A * | 2/1989 | Jennings, Jr. | C09K 8/685 |
| | | | 166/307 |
| 6,302,209 B1 | 10/2001 | Thompson et al. | |
| 6,593,279 B2 | 7/2003 | Von Krosigk et al. | |
| 7,730,058 B2 | 6/2010 | Smith | |
| 8,822,385 B2 | 9/2014 | Quintero et al. | |
| 9,033,047 B2 | 5/2015 | Zhou | |
| 9,505,970 B2 | 11/2016 | Vaughn et al. | |
| 2006/0065400 A1 | 3/2006 | Smith | |
| 2007/0169938 A1 | 7/2007 | Moorehead et al. | |
| 2007/0184938 A1 | 8/2007 | Blauch et al. | |
| 2009/0131285 A1 | 5/2009 | Wang et al. | |
| 2013/0312976 A1 | 11/2013 | Shirley | |
| 2016/0160115 A1 | 6/2016 | Gamage et al. | |
| 2017/0218261 A1* | 8/2017 | Nguyen | E21B 33/138 |

OTHER PUBLICATIONS

M. Khishvand et al., Advances in Water Resources, Science Direct, May 20, 2016. pp. 379-399. vol. 94, Elsevier Ltd., https://www.journals.elsevier.com/advances-in-water-resources.

D.S. Mathew, R.S. Juang, Separation and Purification Technology, Science Direct, Oct. 4, 2006, pp. 199-215, vol. 53, Elsevier Ltd., https://www.journals.elsevier.com/separation-and-purification-technology.

* cited by examiner

ACIDIZING AND INTERFACIAL TENSION REDUCING HYDROLYSABLE OILS FOR SUBTERRANEAN TREATMENTS

TECHNICAL FIELD

The present disclosure relates to the use of multifunction hydrolysable oils to treat subterranean formations, and more particularly, to various systems and methods of using hydrolysable oils as acidizing and interfacial tension reducing additives to increase hydrocarbon production in a carbonaceous or similar formation.

BACKGROUND

Subterranean formations may be treated with various types of acids to stimulate the production of hydrocarbons therefrom. One stimulation method, generally referred to in the art as "acidizing," involves introducing an acid solution into a subterranean formation under pressure to induce the acid solution to flow through the pores in the matrix, or the natural fractures or microfractures, present in or within the subterranean formation. The acid may dissolve any acid-soluble materials it contacts, increasing the size of the pore throats, or fractures, microfractures, or conduits or channels, and increasing connectivity between pore throats, or fractures, microfractures, or conduits or channels. As a result, the permeability of the formation may be increased.

Generally, these acidizing treatments may use highly water soluble acids that are easily dissolved in water and can be delivered in aqueous treatment fluids into the matrix of the subterranean formation. However, issues can arise with these types of acidizing treatments. In particular, some of these water soluble acids may treat only the near wellbore region of the subterranean formation. As these acids are injected into the formation, the acids are able to react with the rock in the near wellbore region and may only contact the surface of said rock in the near wellbore region rather than penetrate deeper into the subterranean formation. Further, in carbonaceous subterranean formations, the acids may spend quickly in the near wellbore region as they react with the rock, resulting in reduced reactivity in the deeper regions of the subterranean formation as the overall amount of unspent acid is reduced. Often this may result in the inability of the acid to penetrate into deeper regions of the subterranean formation and/or to effectively acidize deeper regions of the subterranean formation.

Another issue that may occur is that the water used in these acidizing treatment fluids, can become trapped in the pore throats of the formation matrix. The presence of water in the pore throat may increase the force necessary for oil to flow through the pore throat. As such, hydrocarbon production may be reduced and in some examples, further stimulation treatments may be necessary resulting in increased operational time and expense.

BRIEF DESCRIPTION OF THE DRAWING

Illustrative examples of the present disclosure are described in detail below with reference to the attached drawing figure, which is incorporated by reference herein, and wherein.

Figure 1:
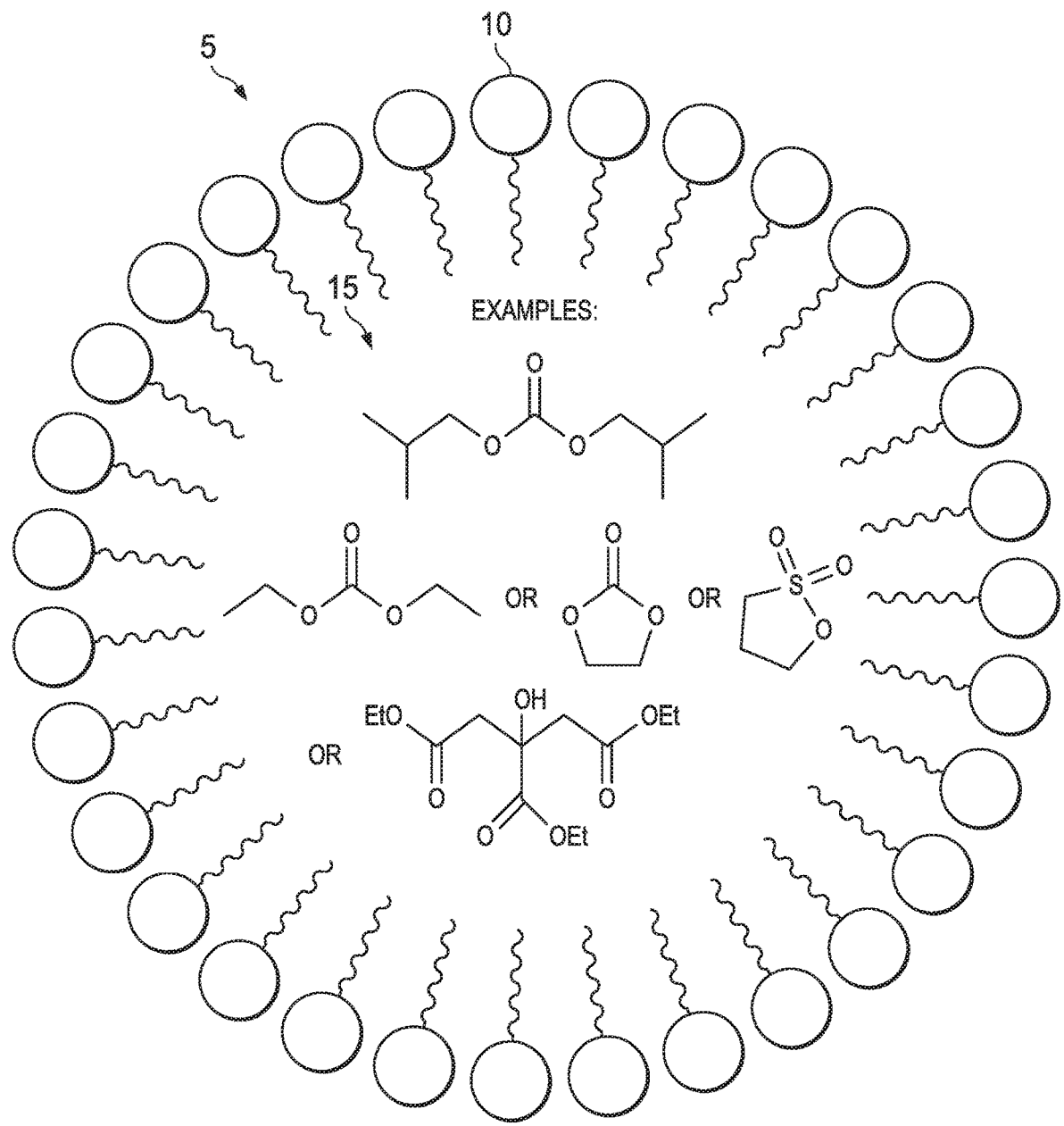
FIG. 1 is a schematic illustrating an example micelle comprising surfactant stabilized multifunction hydrolysable oils according to one or more examples.

The illustrated figures are only exemplary and are not intended to assert or imply any limitation with regard to the environment, architecture, design, or process in which different examples may be implemented.

DETAILED DESCRIPTION

The present disclosure relates to the use of multifunction hydrolysable oils to treat subterranean formations, and more particularly, to various systems and methods of using hydrolysable oils as acidizing and interfacial tension reducing additives to increase hydrocarbon production in a carbonaceous or similar formation.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein comprise the use of a treatment fluid comprising an emulsion of a multifunction hydrolysable oil. The term "fluid" as used herein, refers to an amorphous material capable of flowing and may be used to refer to liquids, gases, or two-phase liquid/gas systems such as foams, aerosols, etc. The treatment fluid may be introduced into a wellbore penetrating a subterranean formation. The subterranean formation may be a subterranean formation subject to or intended to be subject to a stimulation operation. The treatment fluid may be injected into a portion of the subterranean formation. Within the subterranean formation, the multifunction hydrolysable oils may hydrolyze and split into an organic acid and an alcohol. The organic acid may degrade the matrix of the subterranean formation which may increase permeability by increasing the size of the pore throats and pore throat interconnectivity. The alcohol may reduce interfacial tension between the hydrocarbons within the formation and any water present in the formation. This reduction may subsequently dewater the oil phase of any emulsions or mixtures of the hydrocarbons and water and allow for an increase in the flow of the hydrocarbons out of the subterranean formation.

The example treatment fluids described herein comprise an emulsion of a multifunction hydrolysable oil. The multifunction hydrolysable oil may be any small, functionalized oil molecule that is capable of undergoing a hydrolysis reaction under wellbore conditions to yield an organic acid and an alcohol. The multifunction hydrolysable oil may have a molecular weight in the range of about 50 to about 1000 g/mol, alternatively, in a range of about 100 to about 900 g/mol, or further alternatively, in a range of about 200 to about 500 g/mol. The multifunction hydrolysable oil has low solubility in aqueous fluids and in some examples may be insoluble in aqueous fluids. For example, the multifunction hydrolysable oil may have a solubility less than 100 g/L in water, alternatively, less than 70 g/L, or further alternatively, less than 30 g/L. Examples of the multifunction hydrolysable oil and the hydrolysis reaction products include, but are not limited to:

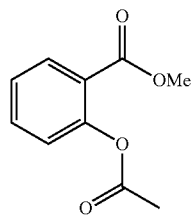
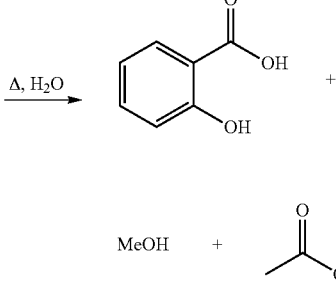

Rxn. 1

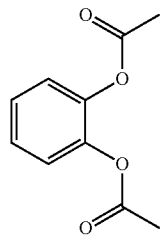
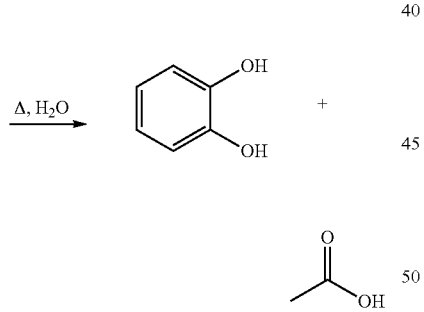

Rxn. 2

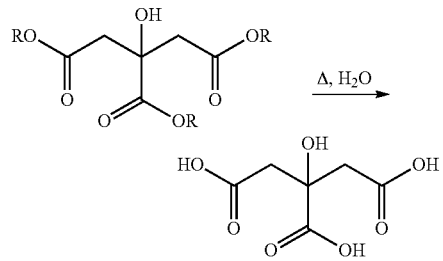

Wherein R is Me, Et, Pr, iPr, cPr, Bu, iBu, sBu, tBu, cBu.

Rxn. 3

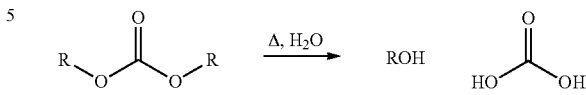

Wherein R is Me, Et, Pr, iPr, cPr, Bu, iBu, sBu, tBu, cBu.

Rxn. 4

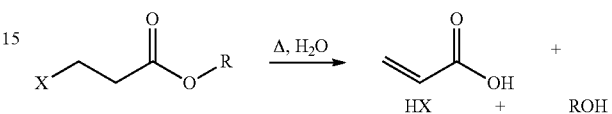

Wherein R is Me, Et, Pr, iPr, cPr, Bu, iBu, sBu, tBu, cBu.
Wherein X is Cl or Br.

Rxn. 5

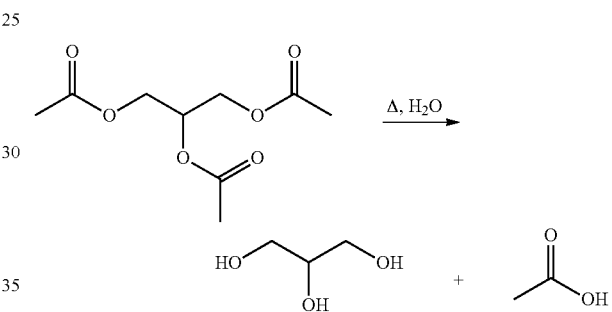

Rxn. 6

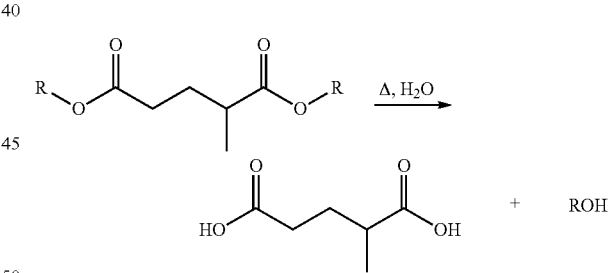

Wherein R is Me, Et, Pr, iPr, cPr, Bu, iBu, sBu, tBu, cBu.

Rxn. 7

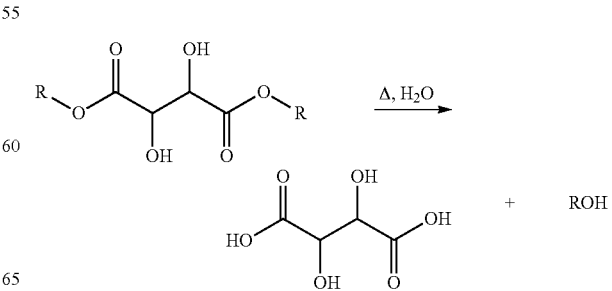

Wherein R is Me, Et, Pr, iPr, cPr, Bu, iBu, sBu, tBu, cBu.

Rxn. 8

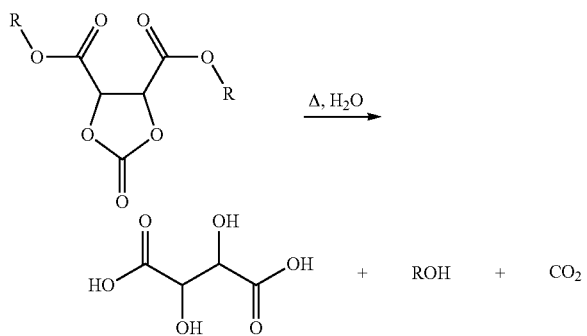

Wherein R is Me, Et, Pr, iPr, cPr, Bu, iBu, sBu, tBu, cBu.

Rxn. 9

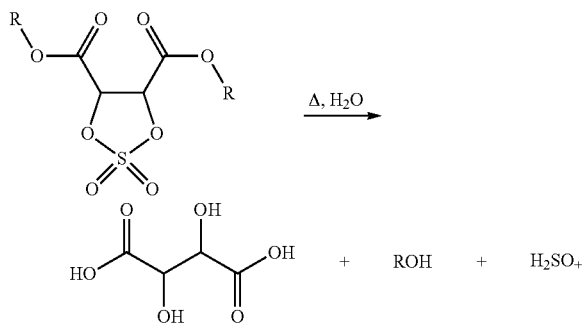

Wherein R is Me, Et, Pr, iPr, cPr, Bu, iBu, sBu, tBu, cBu.

Rxn. 10

The multifunction hydrolysable oils may be used in any combination. Derivatives of the multifunction hydrolysable oils illustrated above may also be used in some examples. As used herein, "Me" refers to a methyl group; "Et" refers to an ethyl group; "Pr" refers to a propyl group; "iPr" refers to an isopropyl group; "cPr" refers to a cyclopropyl group; "Bu" refers to a butyl group; "iBu" refers to an isobutyl group; "sBu" refers to a sec-butyl group; "tBu" refers to a tert-butyl group; and "cBu" refers to a cyclobutyl group. Without limitation, the hydrolysis reactions provided above are presented merely to illustrate various examples of the multifunction hydrolysable oils and their hydrolysis products, and are not to be construed as to limit the scope of the multifunction hydrolysable oil, the disclosure, and the methods and systems described herein.

The multifunction hydrolysable oils may be prepared as an emulsion and added to a carrier fluid to provide the treatment fluid. The emulsion may be a microemulsion or a nanoemulsion having an average droplet size with a diameter less than 1 micron, alternatively less than 500 nm, or further alternatively, less than 200 nm. The treatment fluid may be a liquid treatment fluid or a two-phase liquid/gas system as discussed below.

The concentration of the multifunction hydrolysable oils in the emulsion may range from about 5% (v/v) of the emulsion to about 50% (v/v) of the emulsion. The concentration of the multifunction hydrolysable oils in the emulsion may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the multifunction hydrolysable oils in the emulsion may be about 5% (v/v) of the emulsion, about 10% (v/v) of the emulsion, about 15% (v/v) of the emulsion, about 20% (v/v) of the emulsion, about 25% (v/v) of the emulsion about 30% (v/v) of the emulsion, about 35% (v/v) of the emulsion, about 40% (v/v) of the emulsion, about 45% (v/v) of the emulsion, or about 50% (v/v) of the emulsion. With the benefit of this disclosure, one of ordinary skill in the art will be able to obtain and prepare an emulsion of the multifunction hydrolysable oils for a given application.

An aqueous fluid may be used to prepare the multifunction hydrolysable oil emulsions and may also be used for the carrier fluid in some specific examples to prepare a liquid treatment fluid or a two-phase liquid/gas system. The aqueous fluid may generally be from any source. In various examples, the aqueous fluid may comprise fresh water, salt water, seawater, brine, or an aqueous salt solution. In some examples, the aqueous fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The concentration of the aqueous fluid in the emulsion may range from about 5% (v/v) of the emulsion to about 50% (v/v) of the emulsion. The concentration of the aqueous fluid in the emulsion may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous fluid in the emulsion may be about 5% (v/v) of the emulsion, about 10% (v/v) of the emulsion, about 15% (v/v) of the emulsion, about 20% (v/v) of the emulsion, about 25% (v/v) of the emulsion about 30% (v/v) of the emulsion, about 35% (v/v) of the emulsion, about 40% (v/v) of the emulsion, about 45% (v/v) of the emulsion, or about 50% (v/v) of the emulsion. With the benefit of this disclosure, one of ordinary skill in the art will be able to obtain and prepare an emulsion of the multifunction hydrolysable oils for a given application.

Surfactants may be added to the prepared emulsion of the multifunction hydrolysable oils and the aqueous fluid to stabilize the emulsion. The surfactants may form a micelle that may surround the multifunction hydrolysable oils. FIG. 1 illustrates an example micelle comprising the surfactant stabilized multifunction hydrolysable oils. As illustrated, the example micelle 5 is an aggregate of the surfactants 10 that envelope the multifunction hydrolysable oils 15 within the core. Examples of the surfactants 10 may include, but are not limited to, ethoxylated branched or linear C10-C18 alcohols, C8-C18 alkanolamides, ethoxylated C8-C18 alkanolamides, ethoxylated tall oil, ethoxylated C8-C18 alkylamine, C8-C18 alkylpolyglucoside, dodecylbenzene sulfonate, sulfonate salts of alkyl diphenylether, alpha olefin sulfonate, C8-C16 alkyl sulfate, C8-C18 amine oxides, benzyldimethylalkylammonium chloride, betaines, sultaines, salts thereof, derivatives thereof, and any combination thereof. A commercial example of a suitable surfactant is Tergitol™ 15-S-15 available from Dow Chemical Company of Michigan, USA. TERGITOL™ is a trademark of the Union Carbide Corporation. Another commercial example of a suitable surfactant is Bio-Soft® N25-9 available from Stepan Company of Illinois, USA. BIO-SOFT® is a registered trademark of the Stepan Company. Another commercial example of a suitable surfactant is Makon® TD-18 available from Stepan Company of Illinois, USA. MAKON® is a registered trademark of the Stepan Company. Another commercial example of a suitable surfactant is Amadol 511 available from Akzo Nobel NV of Amsterdam, Netherlands. Another commercial example of a suitable surfactant is Amadol 5133 available from Akzo Nobel NV of Amsterdam, Netherlands. Another commercial example of a suitable surfactant is Ninol® C-5 available from Stepan Company of Illinois, USA. NINOL® is a registered trademark of the Stepan Company. Another commercial example of a suitable surfactant is Ninex® Mt-615 available from Stepan Company of Illinois, USA. NINEX® is a registered trademark of the Stepan Company.

The total concentration of the surfactants 10 in the emulsion is sufficient to reach the critical micelle concentration such that the surfactants 10 aggregate into micelles. The total concentration of the surfactants 10 in the emulsion may range from about 5% (v/v) of the emulsion to about 50% (v/v) of the emulsion. The total concentration of the surfactants 10 in the emulsion may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the surfactants 10 in the emulsion may be about 5% (v/v) of the emulsion, about 10% (v/v) of the emulsion, about 15% (v/v) of the emulsion, about 20% (v/v) of the emulsion, about 25% (v/v) of the emulsion about 30% (v/v) of the emulsion, about 35% (v/v) of the emulsion, about 40% (v/v) of the emulsion, about 45% (v/v) of the emulsion, or about 50% (v/v) of the emulsion. With the benefit of this disclosure, one of ordinary skill in the art will be able to obtain and prepare an emulsion of the multifunction hydrolysable oils for a given application.

Referring again to FIG. 1, the surfactants 10 may form a stable emulsion of micelles 5 to carry and deliver the multifunction hydrolysable oils 15 deep within the subterranean formation. When the treatment fluid contacts formation hydrocarbons, the external micellular environment may change and consequently the integrity of the micelle 5 may fail or otherwise be altered such that the multifunction hydrolysable oils 15 may leach out of the micelle 5. The multifunction hydrolysable oils 15 may hydrolyze and provide organic acid and alcohol hydrolysis products. As the multifunction hydrolysable oils 15 are enveloped within the core of the micelle 5, the multifunction hydrolysable oils 15 may penetrate deeper into the subterranean formation matrix or complex fracture network compared to highly water soluble acids which may adsorb on to the rock surfaces in the near wellbore region and be spent. Once formed, the organic acid would then begin to acidize the subterranean formation, increasing permeability by enlarging pore throats and enhancing pore throat connectivity. The alcohol would lower interfacial tension, dewatering the oil phase of any formed emulsions and easing the ability of the hydrocarbons to flow through the pore throats of the subterranean formation. In preferred examples, the multifunction hydrolysable oils 15 hydrolyze into bulkier alcohols which may be used to further decrease the packing fraction of micellar aggregations upon flowback resulting in greater separation of the hydrocarbons and water.

Co-solvents may be added to the multifunction hydrolysable oils to assist in preparation of the emulsion. Co-solvents may be used to enhance the solvent power of the primary solvents and may thus enhance the solubility of the aqueous and oil phase of the emulsion. Examples of the co-solvents may include, but are not limited to, methanol, ethanol, propanol, isopropanol, n-propanol, butanol, n-butanol, isobutanol, sec-butanol, tert-butanol, 1-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, derivatives thereof, isomers thereof, and any combination thereof.

The total concentration of the co-solvents in the emulsion may range from about 5% (v/v) of the emulsion to about 50% (v/v) of the emulsion. The total concentration of the co-solvents in the emulsion may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the co-solvents in the emulsion may be about 5% (v/v) of the emulsion, about 10% (v/v) of the emulsion, about 15% (v/v) of the emulsion, about 20% (v/v) of the emulsion, about 25% (v/v) of the emulsion about 30% (v/v) of the emulsion, about 35% (v/v) of the emulsion, about 40% (v/v) of the emulsion, about 45% (v/v) of the emulsion, or about 50% (v/v) of the emulsion. With the benefit of this disclosure, one of ordinary skill in the art will be able to obtain and prepare an emulsion of the multifunction hydrolysable oils for a given application.

As discussed above, the multifunction hydrolysable oils may be prepared as an emulsion and added to a carrier fluid to provide the treatment fluid. The emulsion may be a microemulsion or a nanoemulsion having an average droplet size with a diameter less than 1 micron, alternatively less than 500 nm, or further alternatively, less than 200 nm.

The prepared treatment fluid may be introduced into the wellbore to treat the subterranean formation. In examples where the treatment fluid is a liquid, the carrier fluid may be any of the aqueous fluids described herein. Alternatively, the carrier fluid may be liquefied natural gas (hereafter "LNG"). If the carrier fluid is LNG, the LNG may be processed or unprocessed. The carrier fluid may be a different fluid or the same fluid used to prepare the emulsion of the multifunction hydrolysable oils. In an example, the emulsion may be dispersed into a liquid carrier fluid and then delivered to the subterranean formation as a liquid treatment fluid. In examples where the treatment fluid is a two-phase liquid/gas system, such as a foam or a mist, the carrier fluid may be liquefied natural gas or natural gas (e.g., de-liquefied natural gas as explained below). Alternatively, the carrier fluid may be a gas including, but not limited to, methane, ethane, propane, butane, carbon dioxide, nitrogen, or a combination thereof. In an example of a two-phase liquid/gas system, the emulsion may be dispersed within the carrier fluid, for example, as an aerosol. Alternatively, the carrier fluid may be dispersed within the emulsion, for example, as a foam. The two-phase liquid/gas treatment fluid may then be delivered to the subterranean formation. In some examples, the carrier fluid component of the two-phase liquid/gas treatment fluid may need to be energized or otherwise provided in a gaseous state prior or during introduction into the subterranean formation.

The treatment fluid may be any fluid used during the wellbore operation. For example, during a fracturing operation, the treatment fluid may be a PAD fluid, fracturing fluid, displacement fluid, and the like. For example, the treatment fluid may be the chemical-laden stage of a PAD fluid used to fracture the formation. In such an example, the emulsion of multifunction hydrolysable oils may be used to enhance permeability of the fractured formation during the fracturing operation. As another example, the treatment fluid may be a displacement fluid used to separate fluid stages of the wellbore operation. As a further example, the treatment fluid may be a viscous fracturing fluid used to transport a propping agent into a fracture and/or fracture network. The treatment fluid may also be used during other stimulation operations, for example, during repressurization operations. In said example, the treatment fluid may comprise LNG or de-liquefied LNG as the carrier fluid and the treatment fluid may be used to increase formation pressure. In such an example, the emulsion of multifunction hydrolysable oils may be used to enhance permeability of the formation during the repressurization operation. As discussed above, the treatment fluid may be a liquid or a two-phase liquid/gas system (e.g., a foam or aerosol) depending on the chosen operation. It should be clearly understood that the described treatment fluids are merely a few examples of an application of the principles of this disclosure in practice, and a wide variety of other examples are possible as will be apparent or one of ordinary skill in the art. Therefore, the scope of this disclosure is not limited at all to the details described herein. With the benefit of this disclosure, one of ordinary skill in the art will be able to choose and prepare a specific treatment fluid for a desired operation.

The total concentration of the emulsion in the treatment fluid may range from about 0.1% (v/v) of the treatment fluid to about 15% (v/v) of the treatment fluid. The total concentration of the emulsion in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the emulsion in the treatment fluid may be about 0.1% (v/v) of the treatment fluid, about 0.5% (v/v) of the treatment fluid, about 1% (v/v) of the treatment fluid, about 5% (v/v) of the treatment fluid, about 10% (v/v) of the treatment fluid, or about 15% (v/v) of the treatment fluid. With the benefit of this disclosure, one of ordinary skill in the art will be able to obtain and prepare the treatment fluid for a given application.

The present disclosure provides methods and systems for treating a subterranean formation with a treatment fluid comprising an emulsion of multifunction hydrolysable oils. The methods may include preparing a surfactant stabilized microemulsion or nanoemulsion of the multifunction hydrolysable oils with a total concentration of surfactant sufficient to reach the critical micelle concentration such that the surfactant aggregates into micelles and envelops the multifunction hydrolysable oils within the micelle core. The methods may further include adding the emulsion to a treatment fluid. The methods may include pumping the treatment fluid in a wellbore penetrating a subterranean formation. The methods may also include introducing the treatment fluid into a portion of the subterranean formation from the wellbore. The subterranean formation may be fractured and may comprise a complex fracture network. The emulsion may enter the subterranean formation and flow to areas within the subterranean formation containing hydrocarbons. The multifunction hydrolysable oils may leach out of the micelles and into the hydrocarbons. The multifunction hydrolysable oils may hydrolyze and produce an organic acid and alcohol hydrolysis products. The organic acid may increase permeability of the subterranean formation by enlarging the size of the pore throats and by enhancing pore throat connectivity. The alcohol may lower interfacial tension, dewatering the oil phase and easing the ability of the hydrocarbons to flow through the pore throats of the subterranean formation matrix. The systems may include pumping and mixing equipment to convey the treatment fluid to the interval of the wellbore comprising the target subterranean formation.

Example systems may comprise a pump fluidly coupled to a tubular, the tubular containing a treatment fluid comprising the emulsion of the multifunction hydrolysable oils as described herein. The pump may be a high-pressure pump. As used herein, the term "high pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some examples, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps. In other examples, the pump may be a low-pressure pump. As used herein, the term "low pressure pump" will refer to a pump that operates at a pressure of about 1000 psi or less. In some examples, a low-pressure pump may be fluidly coupled to a high-pressure pump that is fluidly coupled to the tubular. That is, the low-pressure pump may be configured to convey the treatment fluid to the high-pressure pump. In such examples, the low-pressure pump may "step up" the pressure of the treatment fluid before it reaches the high-pressure pump.

In some examples, the systems described herein may further comprise a mixing tank that is upstream of the pump and is the vessel in which the treatment fluid is formulated. In various examples, the pump (e.g., a low-pressure pump, a high-pressure pump, or a combination thereof) may convey the treatment fluid from the mixing tank or other source of the treatment fluid to the tubular. In other examples, the treatment fluid may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
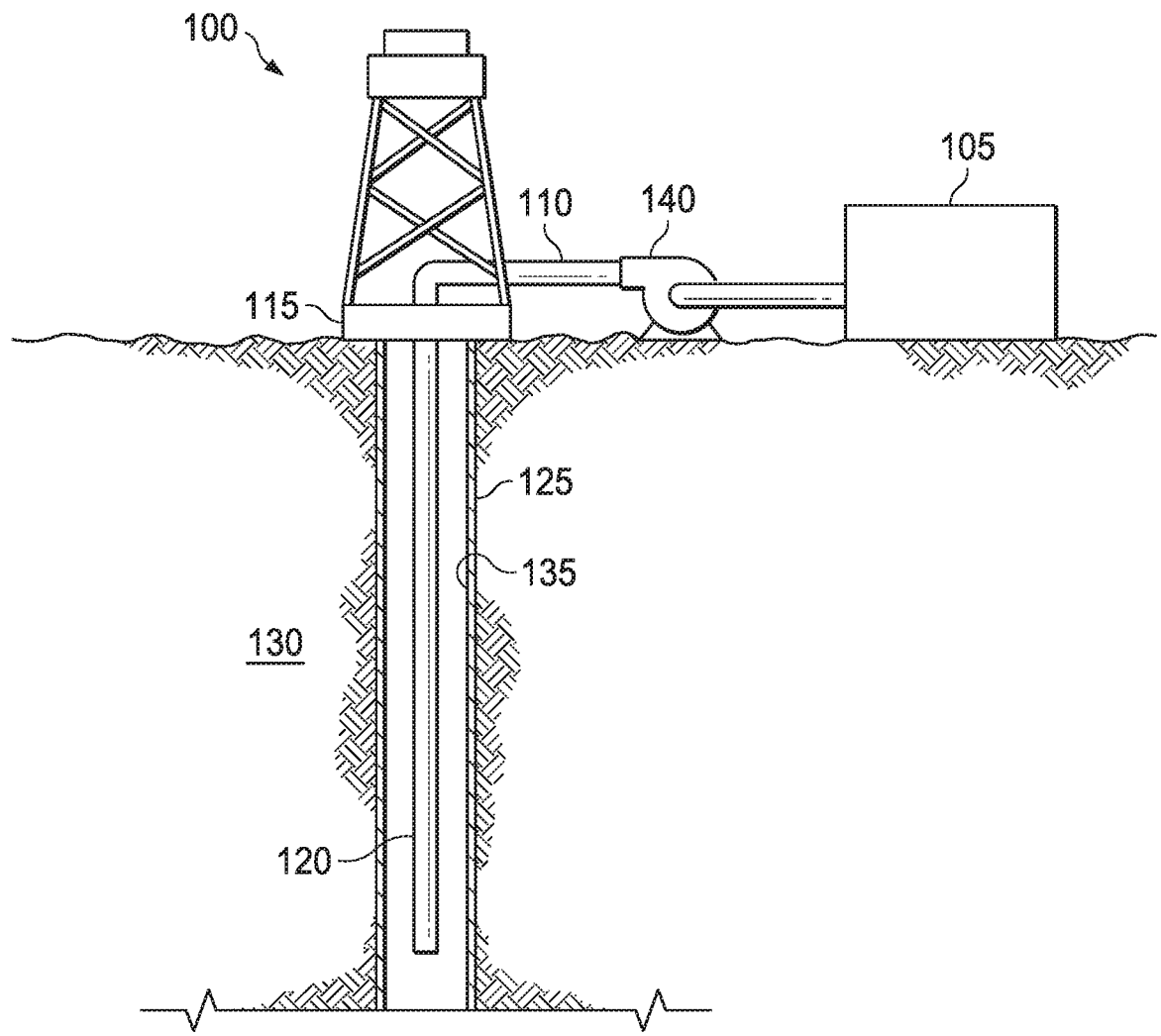
FIG. 2 is a schematic illustrating the surface and near-surface portions of a system to deliver a treatment fluid to a downhole location according to one or more examples.

FIG. 2 illustrates a schematic of the surface and near-surface portions of a system that can deliver the treatment fluids described herein to a downhole location, according to one or more examples. It should be noted that while FIG. 2 generally depicts a land-based system, it is to be recognized that like systems may be operated in subsea locations as well. As depicted in FIG. 2, system 100 may include mixing tank 105, in which a treatment fluid as described herein may be formulated. The treatment fluid may be conveyed via line 110 to wellhead 115, where the treatment fluid enters tubular 120. Tubular 120 may extend from wellhead 115 into a wellbore 125 penetrating subterranean formation 130. Wellbore 125 may be any type of wellbore including vertical, horizontal, deviated, etc. The illustrated portion of wellbore 125 is cased with a casing 135. It is to be understood that in some examples wellbore 125 may be uncased. Upon being ejected from tubular 120, the treatment fluid may subsequently penetrate into subterranean formation 130 as described in FIG. 3 below. Pump 140 may be configured to raise the pressure of the treatment fluid to a desired degree before its introduction into tubular 120. The treatment fluid prepared and conveyed by the system 100 components (e.g., mixing tank 105, tubular 120, pump 140, etc.) comprises an emulsion of multifunction hydrolysable oils as described herein. The treatment fluid may be a liquid or a two phase liquid/gas system. If the treatment fluid is a two phase liquid/gas system, the treatment fluid may be provided as an aerosol with the multifunction hydrolysable oils as the dispersed phase or as a foam with the multifunction hydrolysable oils as the continuous phase. Any of the gases described herein (e.g., methane, ethane, propane, nitrogen, carbon dioxide, natural gas etc.) may be used to produce the aerosol or foam with the multifunction hydrolysable oils. Examples of treatment fluids may include, but are not limited to, displacement fluids, fracturing fluids, PAD fluids, etc.

Although not depicted in FIG. 2, the treatment fluid may, in some examples, flow back to wellhead 115 and exit subterranean formation 130. In some optional examples, the treatment fluid that has flowed back to wellhead 115 may subsequently be recovered and recirculated to subterranean formation 130.

Figure 3:
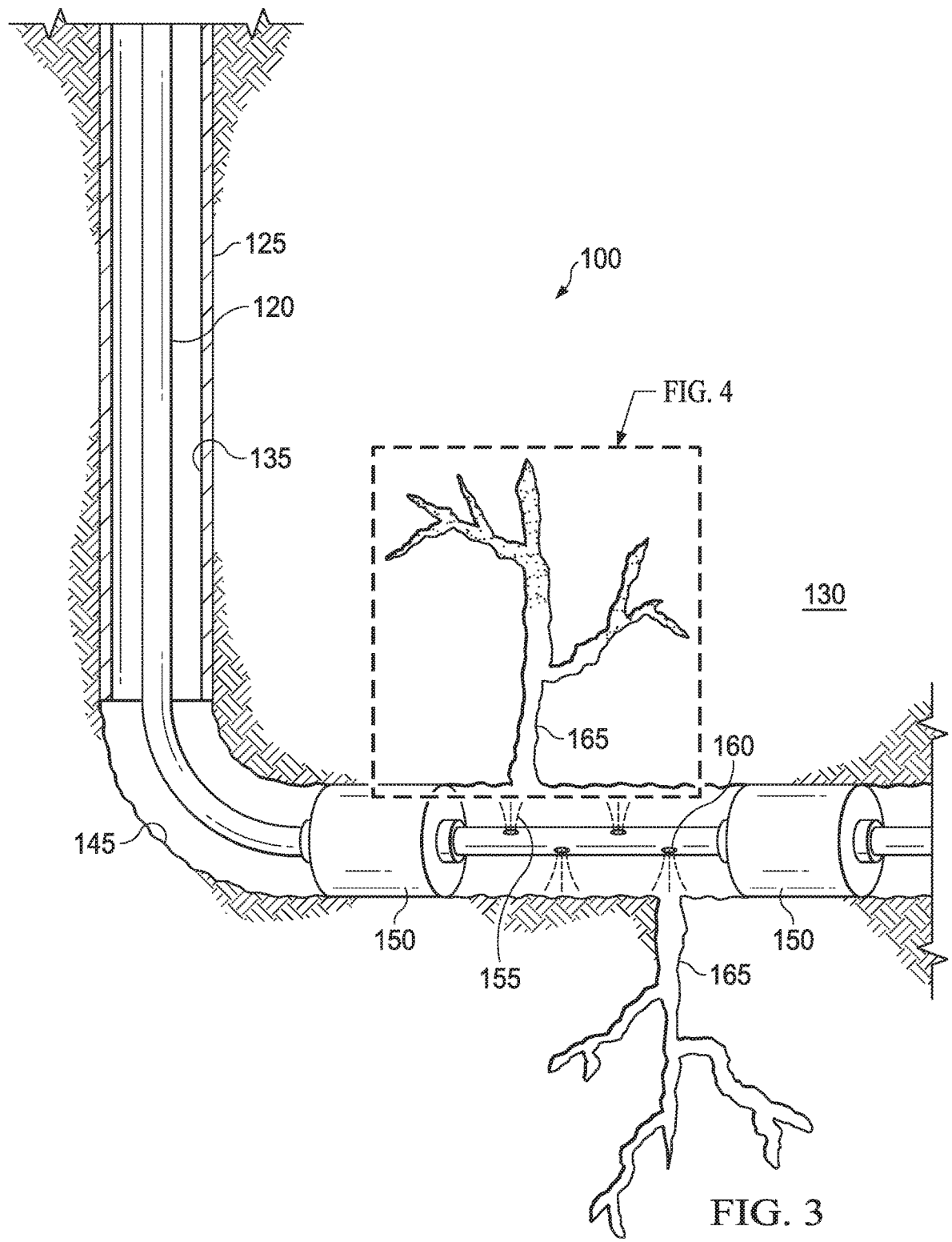
FIG. 3 is a schematic illustrating the downhole portion of the system illustrated in FIG. 2, according to one or more examples.

FIG. 3 illustrates a schematic of the downhole portion of the system 100 illustrated in FIG. 2, according to one or more examples. As depicted in FIG. 3, tubular 120 extends from the wellhead 115 (as illustrated in FIG. 2) into wellbore 125 penetrating subterranean formation 130. After descending through the heel 145 of the wellbore 125, tubular 120 may be coupled to one or more packers 150 positioned to isolate an interval of wellbore 125. A treatment fluid 155, as described herein, may exit tubular 120 through openings 160. The treatment fluid 155 may be introduced into the subterranean formation 130 via a primary fracture 165 of other such opening into the subterranean formation 130. As discussed above, the treatment fluid 155 comprises an emulsion of the multifunction hydrolysable oils as described herein, and may be used to increase permeability and hydrocarbon recovery from the subterranean formation 130. It is to be recognized that system 100 is merely exemplary in nature, and various additional components may be present that have not necessarily been depicted in FIGS. 2 and 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 4:
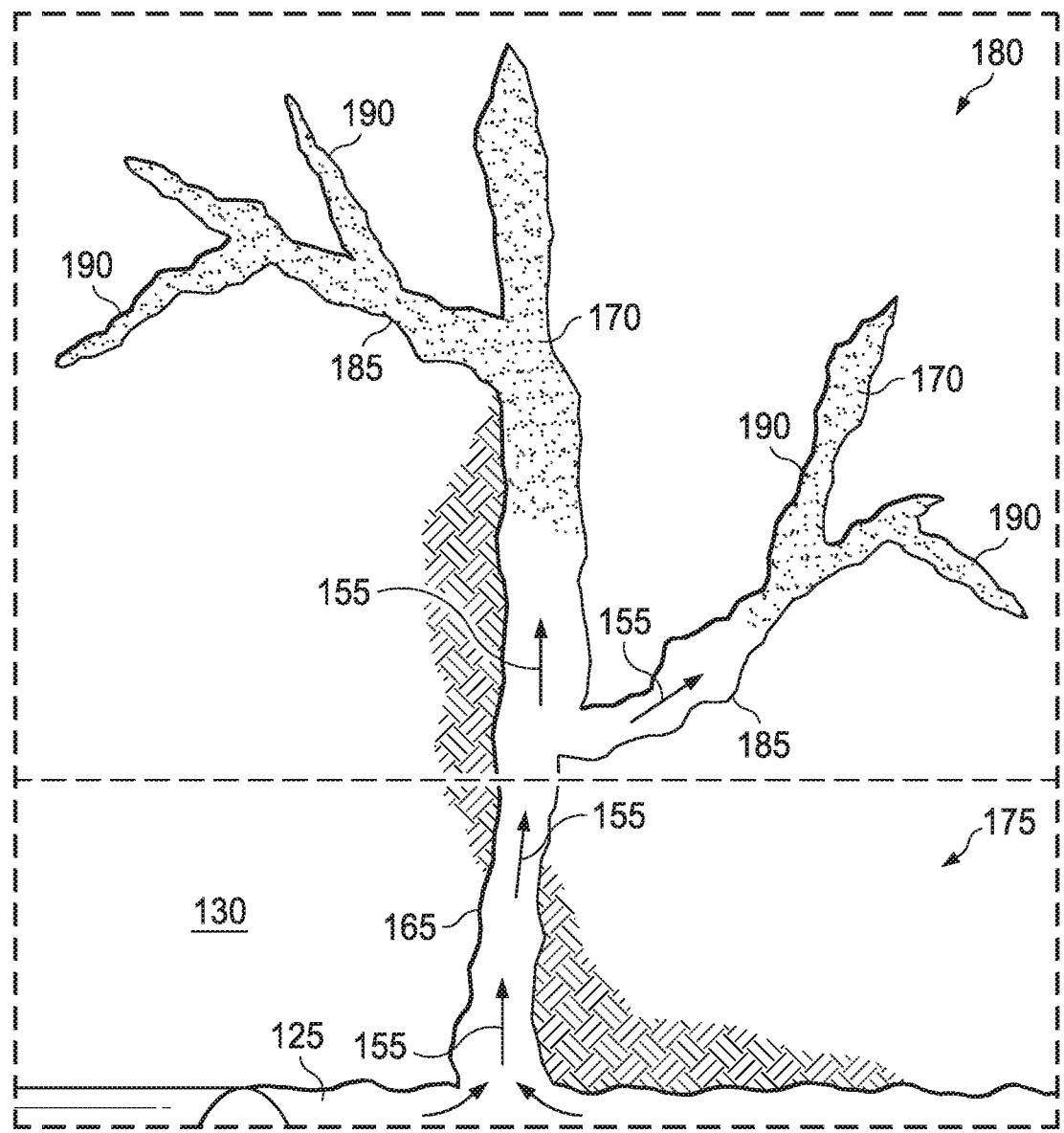
FIG. 4 is a schematic illustrating an example treatment fluid as it is introduced into a primary fracture within the subterranean formation, according to one or more examples.

FIG. 4 illustrates the treatment fluid 155 as it is introduced into a primary fracture 165 within the subterranean formation 130. The surfactant stabilized multifunction hydrolysable oils within the treatment fluid stay within the core of the micelle (e.g., micelle 5 as illustrated in FIG. 1) until contact with hydrocarbons 170 within the subterranean formation 130. The multifunction hydrolysable oils may then leach out of the micelles and hydrolyze forming their respective hydrolysis reaction products. As such, the multifunction hydrolysable oils may flow past the near wellbore region 175 and penetrate into the far wellbore region 180 and/or the secondary 185 and tertiary 190 fractures of a complex fracture network as illustrated.

It should be clearly understood that the system 100 of FIGS. 2-4 is merely one example of an application of the principles of this disclosure in practice, and a wide variety of other examples are possible. Therefore, the scope of this disclosure is not limited at all to the details of FIGS. 2-4 described herein and/or depicted in any of the other FIGURES.

Figure 5:
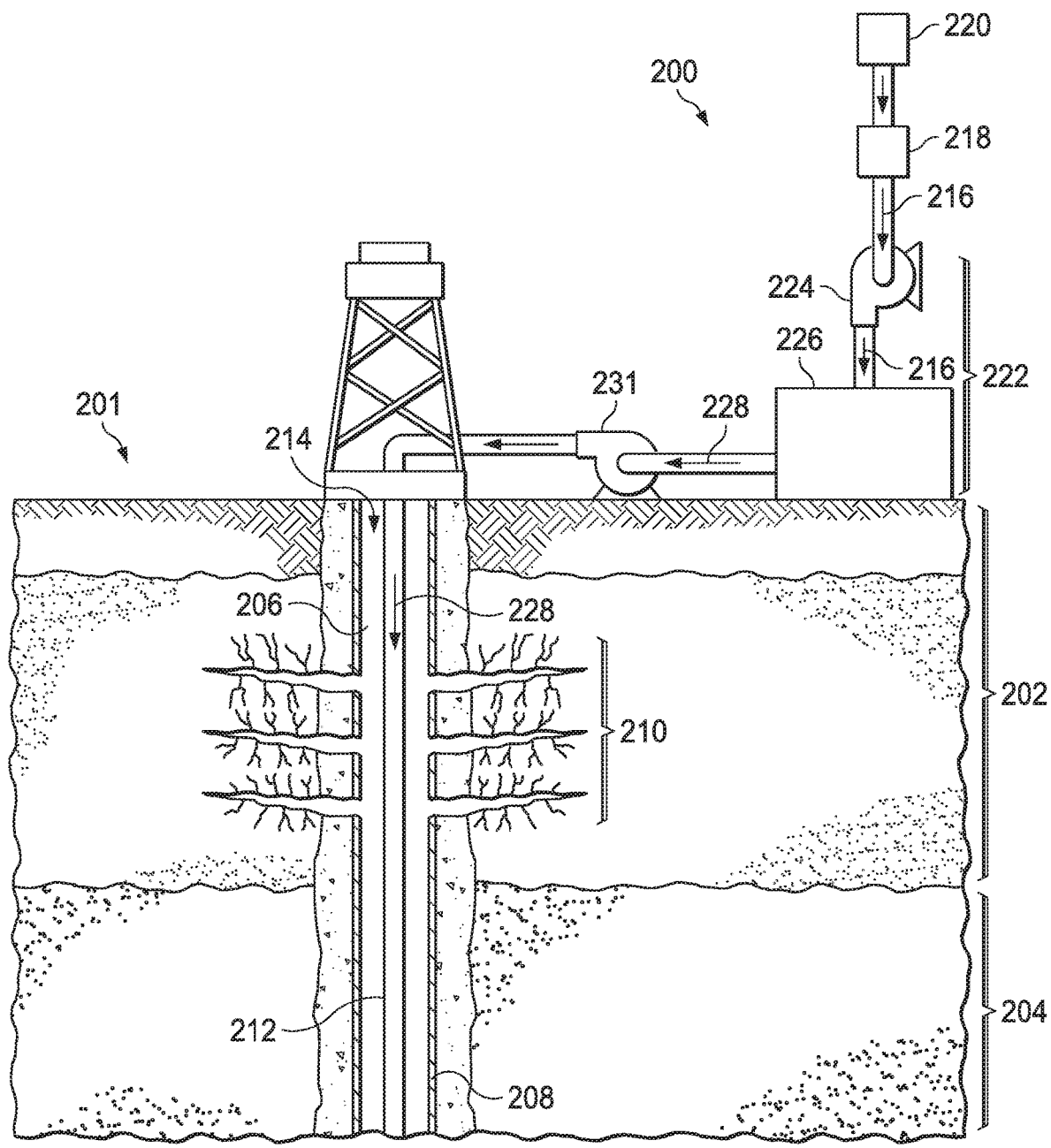
FIG. 5 is a schematic illustrating a repressurization system, according to one or more examples.

FIG. 5 is a schematic view of an example of an LNG pressuring system 200 for pressuring a formation 201. The formation 201 includes reservoir volumes 202, 204 composed of porous and permeable rocks (i.e. reservoir rocks) that contain reservoir fluids (e.g., oil, gas, water, hydrocarbons) located in an onshore environment or in an offshore environment. A well system includes at least one well 206 drilled to penetrate the formation 201 to carry out exploration and extraction of fluids from the reservoir volumes 202, 204. The well 206 of FIG. 5 is shown as near-vertical, but can be formed at any suitable angle to reach a hydrocarbon-rich portion of the formation 201. In other examples, the well 206 can follow a partially-vertical, angled, or even a partially-horizontal path through the formation 201. The well 206 is shown as being lined with a protective lining 208 extending through the formation 201. The protective lining 208 may include a casing, liner, or tubing made of any material, including steel, alloys, or polymers, among others. The well 206 may also be partially or fully openhole (i.e. no protective lining). The protective lining 208 may be perforated so that the reservoir fluids may flow through fractures 210 formed in the formation 201 and into the well 206.

During primary recovery techniques (e.g., natural depletion), reservoir pressure is sufficient so that reservoir fluids can flow from the fractures 210 and into the well 206. As described herein, the reservoir pressure includes the pressure of the fluids present in pore spaces of the reservoir rocks. As the reservoir fluids are produced from the reservoir rocks, the pressure, flow capacity, and recovery factor from the reservoir volume 202 is reduced until production from the well 206 is minimal or no longer feasible. Since the reservoir volume 202 may contain oil that has been relieved of pressure such that the oil is near, at, or below its bubble point, natural gas can be injected into the well 206 to increase pressures to a level equal to or greater than the original reservoir pressures, for example, pressures exhibited at original production conditions. The terms pressured, re-pressured, pressurized, and repressurized are used interchangeably herein to imply that reservoir volume pressures are increased or restored to pressure levels occurring during initial recovery from the well 206.

In operation, the natural gas is injected into the well 206 to flow into a tubing string 212 or an annular area 214 located between an inner surface of the well 206 and the string 212. Specifically, the natural gas introduced into the formation 201 is miscible and/or displaced in the fluids of the reservoir volume 202 to help mobilize and flow the fluids from the reservoir volume 202 into the well 206. Natural gas, as opposed to water, includes a miscibility that is greater in reservoir fluids than the miscibility of water in such fluids. In particular, the molecules of the injected natural gas are capable of mixing or dissolving within the reservoir fluids to lower fluid viscosity and, thus, subsequently assist in the production of higher volumes of reservoir fluids from the reservoir volume 202. Further, the natural gas mixed or dissolved within the reservoir fluids can be released, for instance, using liberation techniques. Thus, unlike water, a portion of the natural gas used to pressurize the reservoir volume 202 can be recovered and later sold and/or further used in other operations.

However, before the natural gas is transported for use via remote pipelines or other remote transportation methods, heavier hydrocarbons and contaminants are often extracted to produce a processed natural gas. In a gaseous form, the low density and flammable nature of the processed natural gas presents various challenges during transportation to the point of use (i.e. the well 206). However, natural gas can be compressed in volume and cooled to or below cryogenic temperatures (e.g., −260° F., −162° C.) to produce LNG 216. The reduction in volume enables natural gas to be transported in liquid form across extended distances and to remote locations where pipelines are not available.

The LNG pressuring system 200 includes a LNG source vessel 218 to store LNG 216 on-site at the well 206. The storage of LNG at the well 206 reduces the distance between the source of the natural gas (e.g., remote pipelines), supply, and the point of injection into the well 206 and thus, overcomes any challenges associated with using and transporting natural gas. The LNG source vessel 218 includes a cooling system or a separate cooling system 220 located at the well 206 to maintain the LNG 216 at cryogenic temperatures. The emulsion of multifunction hydrolysable oils may be added to the LNG 216 (e.g., in the LNG source vessel 218). The LNG 216 may function as the carrier fluid for the emulsion of multifunction hydrolysable oils. The LNG source vessel 218 is further in fluid communication with a cryogenic system 222 capable of deliquefying the LNG 216 to a gaseous state. The cryogenic system 222 includes a cryogenic pump 224 capable of processing fluids at cryogenic temperatures. The cryogenic pump 224 supplies a feed pressure to flow the LNG 216 comprising the emulsion of multifunction hydrolysable oils into a heating unit 226 to be heated and vaporized into natural gas thus providing a de-liquefied LNG treatment fluid 228 which comprises the emulsion of multifunction hydrolysable oils. The de-liquefied LNG treatment fluid 228 is thus provided as a foamed two-phase gas/liquid treatment fluid. In alternative examples, the emulsion of multifunction hydrolysable oils may be added to the de-liquefied LNG 228 directly and foamed as an alternative to being added to the LNG 216 (e.g., in the LNG source vessel 218). Once in a gaseous state, the de-liquefied LNG treatment fluid 228 may flow into the well 206 to increase the reservoir pressure of the reservoir volume 202 and to treat the formation 201. In some cases, an injection pump 231 pressurizes the de-liquefied LNG 228 treatment fluid to maintain an injection flow rate sufficient to inject and deliver the de-liquefied LNG 228 treatment fluid into the well 206 and further into the fractures 210.

The LNG 216 transported to the well 206 may already be processed and thus, free of contaminants including water, hydrogen sulfide, and carbon dioxide, among others. In other examples, the LNG 216 stored in the LNG source vessel 218 may be processed at the well 206 or require additional processing so that additional equipment may be located at the well 206. However, equipment in contact with the LNG 216 must be suitable for cryogenic service, i.e., suitable to handle cryogenic temperatures (e.g., at or below −260° F., −162° C.).

Various physical and chemical factors may reduce the permeability of the reservoir volume 202 to flow the fluids, thus, leading to a reduction in fluid recovery; referred to as formation or reservoir damage. For example, various fluids injected into the well 206 during operations, such as drilling, completion, and production operations, can cause damage to the formation 201 and/or well 206. Additionally, reactions among drilling fluids, production fluids, and formation fluids, such as emulsification due to oil/water incompatibilities, the precipitation of solids, the creation of an immiscible fluid, and water saturation, among others, can limit gas and oil permeabilities. Other damaging factors include organic and inorganic scale formation and depositions, fines production and accumulation, mechanical damage, microorganism growth, and the like. The emulsion of multifunction hydrolysable oils may be used to treat and potentially correct some of these issues by increasing the size of the pore throats and increasing interconnectivity between the pores. Further, the emulsion of multifunction hydrolysable oils may reduce interfacial tension between the hydrocarbons within the formation and any water present in the formation. This reduction may subsequently dewater the oil phase of any emulsions or mixtures of the hydrocarbons and water and allow for an increase in the flow of the hydrocarbons out of the formation 201.

It should be clearly understood that the LNG pressuring system 200 of FIG. 5 is merely one example of an application of the principles of this disclosure in practice, and a wide variety of other examples are possible. Therefore, the scope of this disclosure is not limited at all to the details of FIG. 5 described herein and/or depicted in any of the other FIGURES.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 2-5.

EXAMPLES

The present disclosure can be better understood by reference to the following examples, which are offered by way of illustration. The present disclosure is not limited to the examples given herein.

Example 1

Example 1 is table of example formulations of the surfactant stabilized multifunction hydrolysable oil emulsions in neat form as described herein. The formulations of the emulsions will be diluted to a treating concentration when treatment fluids are prepared. The emulsion formulations are provided below in Table 1.

TABLE 1

Emulsion Composition

| Emulsion Sample No. | Aqueous Phase - Volume: 20% v/v | Multifunction Hydrolysable Oil - Volume: 20% v/v | Co-solvent 1 - Volume: 10% v/v | Co-Solvent 2: Volume: 20% v/v | Surfactant 1 - Volume: 10% v/v | Surfactant 2 - Volume: 10% v/v | Surfactant 3 - Volume: 10% v/v | Total Volume: |
|---|---|---|---|---|---|---|---|---|
| 1 | DI Water | Triethyl Citrate | n-Butanol | Isopropanol | Tergitol ™ 15-S-15 | Amadol 511 | Ninex ® Mt-615 | 10 mL |
| 2 | DI Water | Diethyl Carbonate | n-Butanol | Isopropanol | Tergitol ™ 15-S-15 | Amadol 511 | Ninex ® Mt-615 | 10 mL |
| 3 | DI Water | Triethyl Citrate | n-Butanol | Isopropanol | Tergitol ™ 15-S-15 | Amadol 5133 | Ninex ® Mt-615 | 10 mL |
| 4 | DI Water | Diethyl Carbonate | n-Butanol | Isopropanol | Tergitol ™ 15-S-15 | Amadol 5133 | Ninex ® Mt-615 | 10 mL |
| 5 | DI Water | Triethyl Citrate | n-Butanol | Isopropanol | Tergitol ™ 15-S-15 | Ninol ® C-5 | Ninex ® Mt-615 | 10 mL |
| 6 | DI Water | Diethyl Carbonate | n-Butanol | Isopropanol | Tergitol ™ 15-S-15 | Ninol ® C-5 | Ninex ® Mt-615 | 10 mL |
| 7 | DI Water | Triethyl Citrate | n-Butanol | Isopropanol | Bio-Soft ® N25-9 | Amadol 511 | Ninex ® Mt-615 | 10 mL |
| 8 | DI Water | Diethyl Carbonate | n-Butanol | Isopropanol | Bio-Soft ® N25-9 | Amadol 511 | Ninex ® Mt-615 | 10 mL |
| 9 | DI Water | Triethyl Citrate | n-Butanol | Isopropanol | Bio-Soft ® N25-9 | Amadol 5133 | Ninex ® Mt-615 | 10 mL |
| 10 | DI Water | Diethyl Carbonate | n-Butanol | Isopropanol | Bio-Soft ® N25-9 | Amadol 5133 | Ninex ® Mt-615 | 10 mL |
| 11 | DI Water | Triethyl Citrate | n-Butanol | Isopropanol | Bio-Soft ® N25-9 | Ninol ® C-5 | Ninex ® Mt-615 | 10 mL |
| 12 | DI Water | Diethyl Carbonate | n-Butanol | Isopropanol | Bio-Soft ® N25-9 | Ninol ® C-5 | Ninex ® Mt-615 mL | 10 mL |
| 13 | DI Water | Triethyl Citrate | n-Butanol | Isopropanol | Makon ® TD-18 | Amadol 511 | Ninex ® Mt-615 | 10 mL |
| 14 | DI Water | Diethyl Carbonate | n-Butanol | Isopropanol | Makon ® TD-18 | Amadol 511 | Ninex ® Mt-615 | 10 mL |
| 15 | DI Water | Triethyl Citrate | n-Butanol | Isopropanol | Makon ® TD-18 | Amadol 5133 | Ninex ® Mt-615 | 10 mL |
| 16 | DI Water | Diethyl Carbonate | n-Butanol | Isopropanol | Makon ® TD-18 | Amadol 5133 | Ninex ® Mt-615 | 10 mL |
| 17 | DI Water | Triethyl Citrate | n-Butanol | Isopropanol | Makon ® TD-18 | Ninol ® C-5 | Ninex ® Mt-615 | 10 mL |
| 18 | DI Water | Diethyl Carbonate | n-Butanol | Isopropanol | Makon ® TD-18 | Ninol ® C-5 | Ninex ® Mt-615 | 10 mL |

Example 2

Example 2 is a table of data obtained from dynamic light scattering experiments, hereafter "QELS." The QELS data illustrates the droplet size of the example emulsion formulations detailed in Table 1 of Example 1 above. Two liquid treatment fluids were prepared with the example emulsion formulations detailed in Table 1 of Example 1 above. The two example liquid treatment fluids were prepared using either water or a 7% KCl brine as the carrier fluid. The results of the QELS experiments are provided below in Table 2.

TABLE 2

QELS Droplet Size Data

| Emulsion Sample No. | 2 GPT Water | | | 2 GPT 7% KCl | | |
|---|---|---|---|---|---|---|
| | Haze, Visual | Rh(q)(avg) (nm) | Uncertainty | Haze, Visual | Rh(q)(avg) (nm) | Uncertainty |
| 1 | Clear | 27.9 | 0.1 | Slightly Hazy | 41.3 | 0.1 |
| 2 | Clear | 131.8 | 0.6 | Slightly Hazy | 118.9 | 0.6 |
| 3 | Clear | 4.8 | 0 | Clear | 6.3 | 0 |
| 4 | Clear | 4.6 | 0 | Clear | 6.5 | 0 |
| 5 | Clear | 4.7 | 0 | Clear | 4.2 | 0 |
| 6 | Clear | 4.7 | 0 | Clear | 4.1 | 0 |
| 7 | Clear | 54 | 0.2 | Slightly Hazy | 72.8 | 0.3 |
| 8 | Clear | 84.7 | 0.4 | Slightly Hazy | 85.1 | 0.5 |
| 9 | Clear | 6.7 | 0 | Clear | 13.2 | 0 |
| 10 | Clear | 6.5 | 0 | Clear | 13.8 | 0 |
| 11 | Clear | 4.5 | 0 | Clear | 4.4 | 0 |
| 12 | Clear | 4.4 | 0 | Clear | 4.3 | 0 |

TABLE 2-continued

| | QELS Droplet Size Data | | | | | |
|---|---|---|---|---|---|---|
| Emulsion | 2 GPT Water | | | 2 GPT 7% KCl | | |
| Sample No. | Haze, Visual | Rh(q)(avg) (nm) | Uncer- tainty | Haze, Visual | Rh(q)(avg) (nm) | Uncer- tainty |
| 13 | Clear | 26 | 0.1 | Slightly Hazy | 40.6 | 0.2 |
| 14 | Clear | 149.8 | 0.6 | Slightly Hazy | 91.8 | 0.4 |
| 15 | Clear | 5.2 | 0 | Clear | 6.8 | 0 |
| 16 | Clear | 5.2 | 0 | Clear | 6.9 | 0 |
| 17 | Clear | 4.3 | 0 | Clear | 3.9 | 0 |
| 18 | Clear | 4.4 | 0 | Clear | 3.8 | 0 |

Provided are methods for treating a subterranean formation in accordance with the disclosure and the illustrated FIGURES. An example method comprises preparing an emulsion comprising: an aqueous liquid; a multifunction hydrolysable oil; a co-solvent; and a surfactant. The method further comprises combining the emulsion with a carrier fluid to provide a treatment fluid. The method additionally comprises introducing the treatment fluid to the subterranean formation. The method also comprises contacting hydrocarbons within the subterranean formation with the treatment fluid, and hydrolyzing the multifunction hydrolysable oil to provide an organic acid and an alcohol within the subterranean formation. The multifunction hydrolysable oil may be selected from the group consisting of:

A)

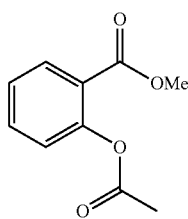

B)

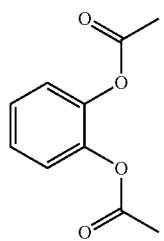

C)

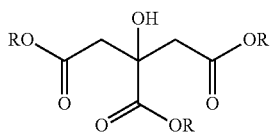

wherein R is Me, Et, Pr, iPr, cPr, Bu, iBu, sBu, tBu, cBu;

D)

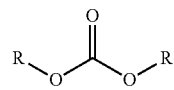

wherein R is Me, Et, Pr, iPr, cPr, Bu, iBu, sBu, tBu, cBu;

E)

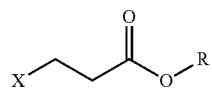

wherein R is Me, Et, Pr, iPr, cPr, Bu, iBu, sBu, tBu, cBu;
wherein X is Cl or Br;

F)

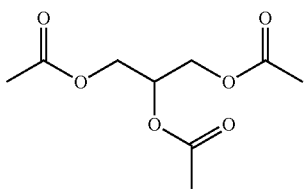

G)

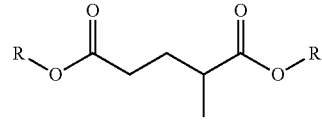

wherein R is Me, Et, Pr, iPr, cPr, Bu, iBu, sBu, tBu, cBu;

H)

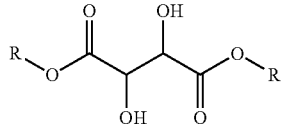

wherein R is Me, Et, Pr, iPr, cPr, Bu, iBu, sBu, tBu, cBu;

I)

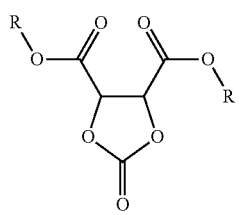

wherein R is Me, Et, Pr, iPr, cPr, Bu, iBu, sBu, tBu, cBu;

J)

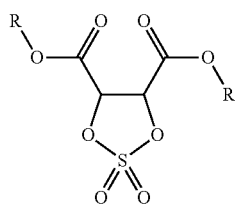

wherein R is Me, Et, Pr, iPr, cPr, Bu, iBu, sBu, tBu, cBu; and any combination of A-J.

The emulsion may have an average droplet size of less than 500 nm. The concentration of the multifunction hydrolysable oil in the emulsion may be in a range of about 5% v/v to about 50% v/v. The surfactant may be selected from the group consisting of ethoxylated branched or linear C10-C18 alcohols, C8-C18 alkanolamides, ethoxylated C8-C18 alkanolamides, ethoxylated tall oil, ethoxylated C8-C18 alkylamine, C8-C16 alkylpolyglucoside, dodecylbenzene sulfonate, sulfonate salts of alkyl diphenylether, alpha olefin sulfonate, C8-C16 alkyl sulfate, C8-C18 amine oxides, benzyldimethylalkylammonium chloride, betaines, sultaines, salts thereof, derivatives thereof, and any combination thereof. The co-solvent may be selected from the group consisting of methanol, ethanol, propanol, isopropanol, n-propanol, butanol, n-butanol, isobutanol, sec-butanol, tert-butanol, 1-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, derivatives thereof, isomers thereof, and any combination thereof. The concentration of the emulsion in the treatment fluid may be in a range of about 0.1% v/v to about 15% v/v. The contacting hydrocarbons within the subterranean formation with the treatment fluid may comprise contacting hydrocarbons within a fracture within the subterranean formation. The treatment fluid may be a liquid treatment fluid and the carrier fluid comprises an aqueous liquid. The treatment fluid may be a two-phase liquid/gas system comprising a foam or an aerosol. The carrier fluid may be liquefied natural gas or de-liquefied liquefied natural gas.

Provided are methods for treating a subterranean formation in accordance with the disclosure and the illustrated FIGURES. An example method comprises preparing an emulsion comprising: an aqueous liquid; a multifunction hydrolysable oil; a co-solvent; and a surfactant. The method further comprises combining the emulsion with liquefied natural gas. The method additionally comprises deliquefying the liquefied natural gas to provide a two-phase gas/liquid treatment fluid. The method also comprises introducing the two-phase gas/liquid treatment fluid to the subterranean formation, contacting hydrocarbons within the subterranean formation with the two-phase gas/liquid treatment fluid, and hydrolyzing the multifunction hydrolysable oil to provide an organic acid and an alcohol within the subterranean formation. The multifunction hydrolysable oil may be selected from the group consisting of:

A)

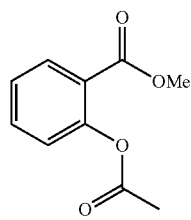

B)

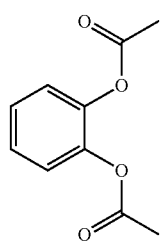

C)

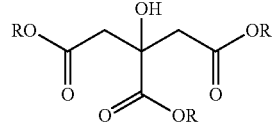

wherein R is Me, Et, Pr, iPr, cPr, Bu, iBu, sBu, tBu, cBu;

D)

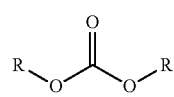

wherein R is Me, Et, Pr, iPr, cPr, Bu, iBu, sBu, tBu, cBu;

E)

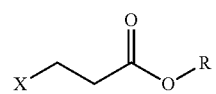

wherein R is Me, Et, Pr, iPr, cPr, Bu, iBu, sBu, tBu, cBu; wherein X is Cl or Br;

F)

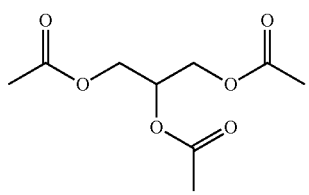

-continued

G)

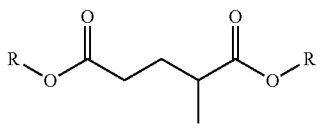

wherein R is Me, Et, Pr, iPr, cPr, Bu, iBu, sBu, tBu, cBu;

H)

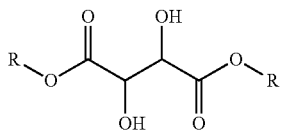

wherein R is Me, Et, Pr, iPr, cPr, Bu, iBu, sBu, tBu, cBu;

I)

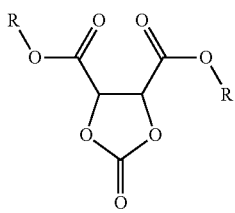

wherein R is Me, Et, Pr, iPr, cPr, Bu, iBu, sBu, tBu, cBu;

J)

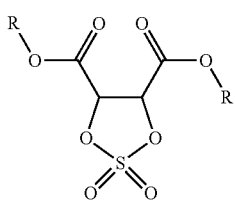

wherein R is Me, Et, Pr, iPr, cPr, Bu, iBu, sBu, tBu, cBu; and any combination of A-J. The contacting hydrocarbons within the subterranean formation with the two-phase gas/liquid treatment fluid may comprises contacting hydrocarbons within a fracture within the subterranean formation. The method may further comprise repressurizing the subterranean formation. The two-phase gas/liquid treatment fluid may be a foam. The two-phase gas/liquid treatment fluid may be an aerosol. The emulsion may have an average droplet size of less than 500 nm. The concentration of the multifunction hydrolysable oil in the emulsion may be in a range of about 5% v/v to about 50% v/v. The surfactant may be selected from the group consisting of ethoxylated branched or linear C10-C18 alcohols, C8-C18 alkanolamides, ethoxylated C8-C18 alkanolamides, ethoxylated tall oil, ethoxylated C8-C18 alkylamine, C8-C16 alkylpolyglucoside, dodecylbenzene sulfonate, sulfonate salts of alkyl diphenylether, alpha olefin sulfonate, C8-C16 alkyl sulfate, C8-C18 amine oxides, benzyldimethylalkylammonium chloride, betaines, sultaines, salts thereof, derivatives thereof, and any combination thereof. The co-solvent may be selected from the group consisting of methanol, ethanol, propanol, isopropanol, n-propanol, butanol, n-butanol, isobutanol, sec-butanol, tert-butanol, 1-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, derivatives thereof, isomers thereof, and any combination thereof. The concentration of the emulsion in the treatment fluid may be in a range of about 0.1% v/v to about 15% v/v.

Provided are systems for treating a subterranean formation in accordance with the disclosure and the illustrated FIGURES. An example system comprises a treatment fluid comprising a carrier fluid and an emulsion. The emulsion comprises an aqueous liquid, a multifunction hydrolysable oil, a co-solvent, and a surfactant. The system further comprises mixing equipment capable of containing the treatment fluid and pumping equipment capable of pumping the treatment fluid into a wellbore. The multifunction hydrolysable oil may be selected from the group consisting of:

A)

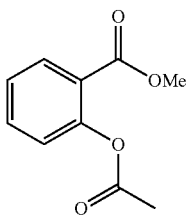

B)

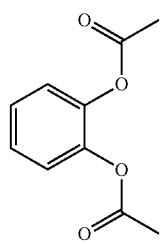

C)

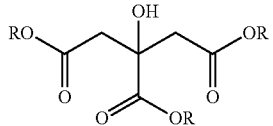

wherein R is Me, Et, Pr, iPr, cPr, Bu, iBu, sBu, tBu, cBu;

D)

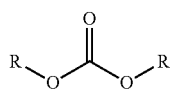

wherein R is Me, Et, Pr, iPr, cPr, Bu, iBu, sBu, tBu, cBu;

E)

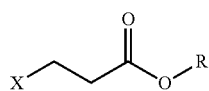

wherein R is Me, Et, Pr, iPr, cPr, Bu, iBu, sBu, tBu, cBu;
wherein X is Cl or Br;

F)

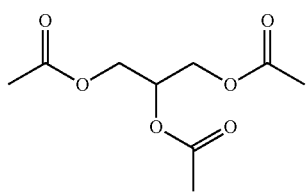

G)

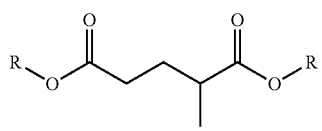

wherein R is Me, Et, Pr, iPr, cPr, Bu, iBu, sBu, tBu, cBu;

H)

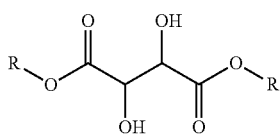

wherein R is Me, Et, Pr, iPr, cPr, Bu, iBu, sBu, tBu, cBu;

I)

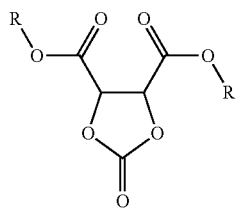

wherein R is Me, Et, Pr, iPr, cPr, Bu, iBu, sBu, tBu, cBu;

J)

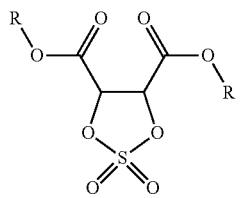

wherein R is Me, Et, Pr, iPr, cPr, Bu, iBu, sBu, tBu, cBu; and any combination of A-J. The emulsion may have an average droplet size of less than 500 nm. The concentration of the multifunction hydrolysable oil in the emulsion may be in a range of about 5% v/v to about 50% v/v. The surfactant may be selected from the group consisting of ethoxylated branched or linear C10-C18 alcohols, C8-C18 alkanolamides, ethoxylated C8-C18 alkanolamides, ethoxylated tall oil, ethoxylated C8-C18 alkylamine, C8-C16 alkylpolyglucoside, dodecylbenzene sulfonate, sulfonate salts of alkyl diphenylether, alpha olefin sulfonate, C8-C16 alkyl sulfate, C8-C18 amine oxides, benzyldimethylalkylammonium chloride, betaines, sultaines, salts thereof, derivatives thereof, and any combination thereof. The co-solvent may be selected from the group consisting of methanol, ethanol, propanol, isopropanol, n-propanol, butanol, n-butanol, isobutanol, sec-butanol, tert-butanol, 1-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, derivatives thereof, isomers thereof, and any combination thereof. The concentration of the emulsion in the treatment fluid may be in a range of about 0.1% v/v to about 15% v/v. The system may be configured to contact hydrocarbons within the subterranean formation with the treatment fluid. The system may be further configured to contact hydrocarbons within a fracture within the subterranean formation. The treatment fluid may be a liquid treatment fluid and the carrier fluid may comprise an aqueous liquid. The treatment fluid may be a two-phase liquid/gas system comprising a foam or an aerosol. The carrier fluid may be liquefied natural gas or de-liquefied liquefied natural gas.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:
1. A method for acidizing a subterranean formation comprising:
preparing an emulsion comprising:
an aqueous liquid;
a multifunction hydrolysable oil;
at least two co-solvents; and
a surfactant selected from the group consisting of ethoxylated branched or linear C10-C18 alcohols, ethoxylated tall oil, C8-C16 alkylpolyglucoside, dodecylbenzene sulfonate, sulfonate salts of alkyl diphenylether, alpha olefin sulfonate, C8-C16 alkyl sulfate, benxyldimethylalkylammonium chloride, sultaines, salts thereof, derivatives thereof, and any combination thereof, wherein the emulsion has an average droplet size of less than 500 nm;

adjusting the concentration of the surfactant to reach a critical micelle concentration of the surfactant such that the surfactant aggregates into micelles, wherein at least a portion of the multifunction hydrolysable oil is surrounded by a micelle;

combining the emulsion with a carrier fluid to provide a treatment fluid;

introducing the treatment fluid to the subterranean formation;

contacting hydrocarbons within the subterranean formation with the treatment fluid; and hydrolyzing the multifunction hydrolysable oil to provide an organic acid and an alcohol within the subterranean formation.

2. The method of claim 1, wherein the multifunction hydrolysable oil is selected from the group consisting of:

A)

[structure: methyl 2-(acetyloxy)benzoate]

B)

[structure: 1,2-phenylene diacetate]

C)

[structure: trialkyl citrate with OH]

wherein R is Me, Et, Pr, iPr, cPr, Bu, iBu, sBu, tBu, cBu;

D)

[structure: dialkyl carbonate R-O-C(=O)-O-R]

wherein R is Me, Et, Pr, iPr, cPr, Bu, iBu, sBu, tBu, cBu;

E)

[structure: X-CH2-CH2-C(=O)-O-R]

wherein R is Me, Et, Pr, iPr, cPr, Bu, iBu, sBu, tBu, cBu;
wherein X is Cl or Br;

F)

[structure: triacetin / glycerol triacetate]

G)

[structure: dialkyl 2-methylglutarate]

wherein R is Me, Et, Pr, iPr, cPr, Bu, iBu, sBu, tBu, cBu;

H)

[structure: dialkyl tartrate]

wherein R is Me, Et, Pr, iPr, cPr, Bu, iBu, sBu, tBu, cBu;

I)

[structure: dialkyl 2,3-cyclic carbonate dicarboxylate]

wherein R is Me, Et, Pr, iPr, cPr, Bu, iBu, sBu, tBu, cBu;

J)

[structure: dialkyl 2,3-cyclic sulfate dicarboxylate]

wherein R is Me, Et, Pr, iPr, cPr, Bu, iBu, sBu, tBu, cBu; and any combination of A-J.

3. The method of claim 1, wherein the concentration of the multifunction hydrolysable oil in the emulsion is in a range of about 5% v/v to about 50% v/v.

4. The method of claim 1, wherein the co-solvents are selected from the group consisting of methanol, ethanol, propanol, isopropanol, n-propanol, butanol, n-butanol, isobutanol, sec-butanol, tert-butanol, 1-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, derivatives thereof, isomers thereof, and any combination thereof.

5. The method of claim 1, wherein the concentration of the emulsion in the treatment fluid is in a range of about 0.1% v/v to about 15% v/v.

6. The method of claim 1, wherein the contacting hydrocarbons within the subterranean formation with the treatment fluid comprises contacting hydrocarbons within a fracture within the subterranean formation.

7. The method of claim 1, wherein the treatment fluid is a liquid treatment fluid and the carrier fluid comprises an aqueous liquid.

8. The method of claim 1, wherein the treatment fluid is a two-phase liquid/gas system comprising a foam or an aerosol.

9. The method of claim 1, wherein the carrier fluid is liquefied natural gas or de-liquefied liquefied natural gas.

10. A method for acidizing a subterranean formation comprising:
    preparing an emulsion comprising:
        an aqueous liquid;
        a multifunction hydrolysable oil;
        at least two co-solvents; and
        a surfactant selected from the group consisting of ethoxylated branched or linear C10-C18 alcohols, ethoxylated tall oil, C8-C16 alkylpolyglucoside, dodecylbenzene sulfonate, sulfonate salts of alkyl diphenylether, alpha olefin sulfonate, C8-C16 alkyl sulfate, benxyldimethylalkylammonium chloride, sultaines, salts thereof, derivatives thereof, and any combination thereof, wherein the emulsion has an average droplet size of less than 500 nm;
    adjusting the concentration of the surfactant to reach a critical micelle concentration of the surfactant such that the surfactant aggregates into micelles, wherein at least a portion of the multifunction hydrolysable oil is surrounded by a micelle;
    combining the emulsion with liquefied natural gas;
    deliquefying the liquefied natural gas to provide a two-phase gas/liquid treatment fluid;
    introducing the two-phase gas/liquid treatment fluid to the subterranean formation;
    contacting hydrocarbons within the subterranean formation with the two-phase gas/liquid treatment fluid; and
    hydrolyzing the multifunction hydrolysable oil to provide an organic acid and an alcohol within the subterranean formation.

11. The method of claim 10, wherein the multifunction hydrolysable oil is selected from the group consisting of:

A) 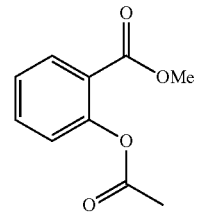

B) 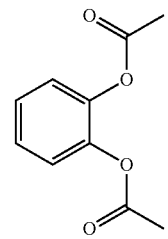

C) 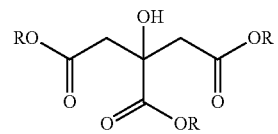

wherein R is Me, Et, Pr, iPr, cPr, Bu, iBu, sBu, tBu, cBu;

D) 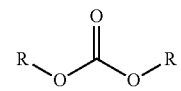

wherein R is Me, Et, Pr, iPr, cPr, Bu, iBu, sBu, tBu, cBu;

E) 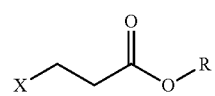

wherein R is Me, Et, Pr, iPr, cPr, Bu, iBu, sBu, tBu, cBu;
wherein X is Cl or Br;

F) 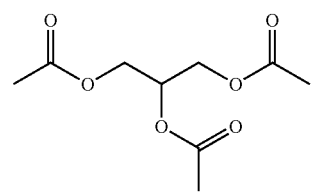

-continued

G)

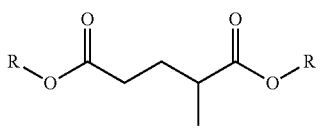

wherein R is Me, Et, Pr, iPr, cPr, Bu, iBu, sBu, tBu, cBu;

H)

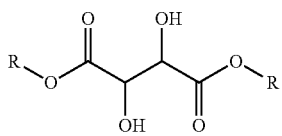

wherein R is Me, Et, Pr, iPr, cPr, Bu, iBu, sBu, tBu, cBu;

I)

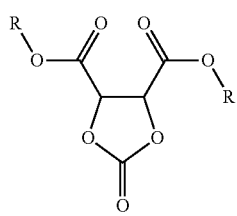

wherein R is Me, Et, Pr, iPr, cPr, Bu, iBu, sBu, tBu, cBu;

J)

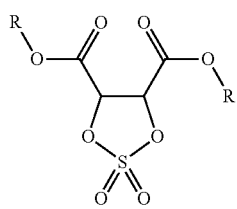

wherein R is Me, Et, Pr, iPr, cPr, Bu, iBu, sBu, tBu, cBu; and any combination of A-J.

12. The method of claim 10, wherein the contacting hydrocarbons within the subterranean formation with the two-phase gas/liquid treatment fluid comprises contacting hydrocarbons within a fracture within the subterranean formation.

13. The method of claim 10, further comprising repressurizing the subterranean formation.

14. The method of claim 10, wherein the two-phase gas/liquid treatment fluid is a foam.

15. A system for acidizing a subterranean formation comprising:
an acidizing treatment fluid comprising a carrier fluid and
an emulsion, wherein the emulsion comprises:
an aqueous liquid;
a multifunction hydrolysable oil;
at least two co-solvents; and
a surfactant selected from the group consisting of ethoxylated branched or linear C10-C18 alcohols, ethoxylated tall oil, C8-C16 alkylpolyglucoside, dodecylbenzene sulfonate, sulfonate salts of alkyl diphenylether, alpha olefin sulfonate, C8-C16 alkyl sulfate, benxyldimethylalkylammonium chloride, sultaines, salts thereof, derivatives thereof, and any combination thereof, wherein the concentration of the surfactant is adjusted to reach a critical micelle concentration of the surfactant such that the surfactant aggregates into micelles, wherein at least a portion of the multifunction hydrolysable oil is surrounded by a micelle, and wherein the emulsion has an average droplet size of less than 500 nm;
mixing equipment capable of containing the treatment fluid; and
pumping equipment capable of pumping the treatment fluid into a wellbore.

16. The system of claim 15, wherein the multifunction hydrolysable oil is selected from the group consisting of:

A)

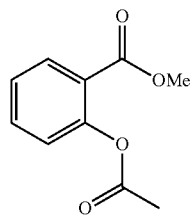

B)

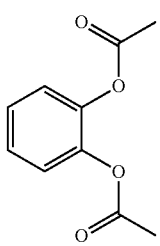

C)

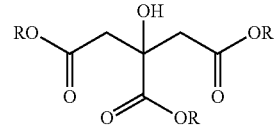

wherein R is Me, Et, Pr, iPr, cPr, Bu, iBu, sBu, tBu, cBu;

D)

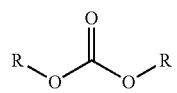

wherein R is Me, Et, Pr, iPr, cPr, Bu, iBu, sBu, tBu, cBu;

E)

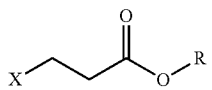

wherein R is Me, Et, Pr, iPr, cPr, Bu, iBu, sBu, tBu, cBu;

wherein X is Cl or Br;

F) 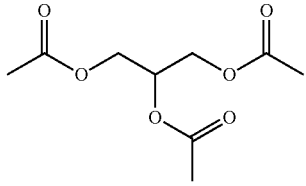

G) 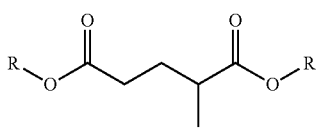

wherein R is Me, Et, Pr, iPr, cPr, Bu, iBu, sBu, tBu, cBu;

H) 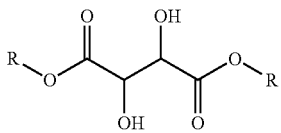

wherein R is Me, Et, Pr, iPr, cPr, Bu, iBu, sBu, tBu, cBu;

I) 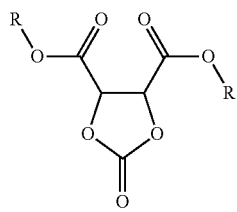

wherein R is Me, Et, Pr, iPr, cPr, Bu, iBu, sBu, tBu, cBu;

J) 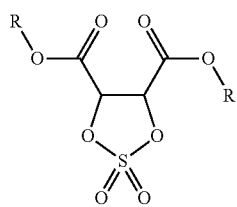

wherein R is Me, Et, Pr, iPr, cPr, Bu, iBu, sBu, tBu, cBu; and any combination of A-J.

17. The system of claim 15, wherein the treatment fluid is a foam or an aerosol.

18. The system of claim 15, wherein the concentration of the multifunction hydrolysable oil in the emulsion is in a range of about 5% v/v to about 50% v/v.

19. The system of claim 15, wherein the treatment fluid is a liquid treatment fluid and the carrier fluid comprises an aqueous liquid.

20. The system of claim 15, wherein the carrier fluid is liquefied natural gas or de-liquefied liquefied natural gas.

* * * * *